(12) United States Patent
Yeo

(10) Patent No.: US 9,262,646 B1
(45) Date of Patent: Feb. 16, 2016

(54) SYSTEMS AND METHODS FOR MANAGING WEB BROWSER HISTORIES

(71) Applicant: Symantec Corporation, Mountain View, CA (US)

(72) Inventor: Matthew Yeo, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 126 days.

(21) Appl. No.: 13/907,378

(22) Filed: May 31, 2013

(51) Int. Cl.
*G06F 21/10* (2013.01)
*G06F 21/62* (2013.01)

(52) U.S. Cl.
CPC .................................. *G06F 21/6227* (2013.01)

(58) Field of Classification Search
CPC ....................................................... G06Q 10/10
USPC .......................................................... 726/26
See application file for complete search history.

(56) References Cited

U.S. PATENT DOCUMENTS

| | | | | |
|---|---|---|---|---|
| 6,453,342 B1* | 9/2002 | Himmel et al. | ................ | 709/213 |
| 6,463,533 B1* | 10/2002 | Calamera | .......... | H04L 29/12009 |
| | | | | 713/163 |
| 7,096,358 B2* | 8/2006 | Zizzi | .............................. | 713/165 |
| 7,096,493 B1* | 8/2006 | Liu | .................... | 726/8 |
| 7,137,009 B1* | 11/2006 | Gordon et al. | ................ | 713/185 |
| 7,197,568 B2* | 3/2007 | Bourne et al. | ................ | 709/229 |
| 7,269,727 B1* | 9/2007 | Mukherjee | .............. | H04L 63/08 |
| | | | | 370/401 |
| 7,289,980 B2* | 10/2007 | Kogut-O'Connell | | G06F 17/3089 |
| 7,979,909 B2* | 7/2011 | Jancula | .............. | H04L 63/0428 |
| | | | | 726/26 |
| 2004/0049541 A1* | 3/2004 | Swahn | ......................... | 709/203 |
| 2007/0006310 A1* | 1/2007 | Piccard | ........................... | 726/24 |
| 2008/0288536 A1* | 11/2008 | Pfeiffer et al. | ............. | 707/104.1 |
| 2009/0077495 A1* | 3/2009 | Bhat et al. | ...................... | 715/811 |
| 2009/0144451 A1* | 6/2009 | Cabezas et al. | ............... | 709/248 |
| 2009/0222736 A1* | 9/2009 | Clark | ................ | G06F 17/30876 |
| | | | | 715/738 |
| 2009/0248642 A1* | 10/2009 | Gurin et al. | ........................ | 707/3 |
| 2009/0300012 A1* | 12/2009 | Levow | ................ | G06Q 10/107 |
| 2010/0106770 A1* | 4/2010 | Taylor et al. | .................. | 709/203 |
| 2010/0274786 A1* | 10/2010 | Harris et al. | .................. | 707/737 |
| 2011/0208732 A1* | 8/2011 | Melton et al. | ................. | 707/728 |
| 2011/0320526 A1* | 12/2011 | Bhogal et al. | ................. | 709/203 |
| 2012/0185949 A1* | 7/2012 | Phillips | ............... | G06F 21/6263 |
| | | | | 726/26 |
| 2013/0347068 A1* | 12/2013 | Elleboe et al. | .................... | 726/3 |
| 2014/0181889 A1* | 6/2014 | Black | ..................... | G06F 21/55 |
| | | | | 726/1 |

OTHER PUBLICATIONS

Akostaapps; Clear Browser History; https://play.google.com/store/apps/details?id=akostaapps.clearbrowserhistory.paid; Nov. 17, 2012.

* cited by examiner

*Primary Examiner* — Farid Homayounmehr
*Assistant Examiner* — Thanh T Le
(74) *Attorney, Agent, or Firm* — ALG Intellectual Property, LLC

(57) ABSTRACT

A computer-implemented method for managing web browser histories may include (1) identifying a website visited via a web browser, (2) selecting one or more website categories for which websites are not to be referenced in the web browser history, (3) querying a website categorization database to verify whether the visited website belongs to a selected website category, (4) receiving, in response to querying the website categorization database, an indication that the website belongs to a selected website category, and (5) blocking, based on the website belonging to a selected category, the website from being referenced in the web browser history. Various other methods, systems, and computer-readable media are also disclosed.

20 Claims, 7 Drawing Sheets

SYSTEMS AND METHODS FOR MANAGING WEB BROWSER HISTORIES

BACKGROUND

Although the Internet began as a communications medium primarily for military and academic research, it has increased in scope to include business, commerce, entertainment, and nearly every aspect of Internet users' personal lives. The intersections between personal, family, professional, and public spheres are areas of vulnerability, where private information may be disclosed to unintended audiences. Advertisers, law enforcement, current and potential employers, hackers, and scammers all have an interest in gathering personal information to which they may not be entitled, and individuals may wish to maintain a level of privacy even from close friends and immediate family members.

Web browser histories are a potential treasure trove of personal data. Records of visited websites may reveal a user's interests, beliefs, affiliations, habits, wishes, weaknesses, or addictions. To prevent the collection of a browser history, the option exists to not maintain a browser history at all, and most browsers now allow the user to easily switch to a browsing mode that does not maintain a history. However, browser histories are a useful record of websites to which the user may wish to return. Rather, the user may want maintain a browser history, but also protect their privacy by keeping a record of certain website visits out of the history. To that end, the user may delete certain websites from the browser history manually, but this approach would require a considerable commitment of time and attention from the user. Accordingly, the instant disclosure identifies and addresses a need for additional and improved systems and methods for managing web browser histories.

SUMMARY

As will be described in greater detail below, the instant disclosure generally relates to systems and methods for managing web browser histories by blocking websites belonging to a selected category from being referenced in a web browser history.

In one example, a computer-implemented method for managing web browser histories may include (1) identifying a website visited via a web browser, (2) selecting one or more website categories for which websites are not to be referenced in the web browser history, (3) querying a website categorization database to verify whether the visited website belongs to a selected website category, (4) receiving, in response to querying the website categorization database, an indication that the website belongs to a selected website category, and (5) blocking, based on the website belonging to a selected category, the website from being referenced in the web browser history.

In some examples, selecting the website category may include displaying a user interface element that enables a user to select one or more website categories. Additionally or alternatively, selecting the website category may include querying the website categorization database for a list of website categories to be displayed via a user interface element for selection by the user.

In some embodiments, the privacy of selected website categories may be ensured by storing them in an encrypted data store. The encrypted data store may be accessible only to an authenticated user. Additionally, the method may include caching selected website categories together with associated, previously-visited websites, identifying a subsequently-visited website, and blocking the subsequently-visited website from being reference in the web browser history, based on the presence of the subsequently-visited website matching a previously-visited website in the cache. The cache may also be encrypted, and in one embodiment, encrypted by a one-way hash function. Searching for a website in a cache encrypted with a one-way hash function may entail encrypting a subsequently-visited website using the one-way hash function and searching the cache with the encrypted website identifier to identify the category associated with the website, but without revealing the visited website.

In some examples, websites belonging to a selected category are prevented from being saved in the web browser history. Additionally, in some examples, websites present in the web browser history and belonging to a selected category are deleted from the history.

In one embodiment, a system for implementing the above-described method may include (1) an identification module that identifies a website visited with a web browser (2) a selection module that selects one or more website categories for which websites are not to be referenced in a web browser history, (3) a query module that queries a website categorization database to verify whether the visited website belongs to a selected website category, (4) a receiving module that receives, in response to querying the website categorization database, an indication that the website belongs to a website category, and (5) a blocking module that blocks, based on the website belonging to a selected category, the website from being referenced in the web browser history. In some examples, the system may also include at least one processor that executes the identification module, the selection module, the query module, the receiving module, and the blocking module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a website visited via a web browser, (2) select one or more website categories for which websites are not to be referenced in a web browser history, (3) query a website categorization database to verify whether the visited website belongs to a selected website category, (4) receive, in response to querying the website categorization database, an indication that the website belongs to a selected website category, and (5) block, based on the website belonging to a selected category, the website from being referenced in the web browser history.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
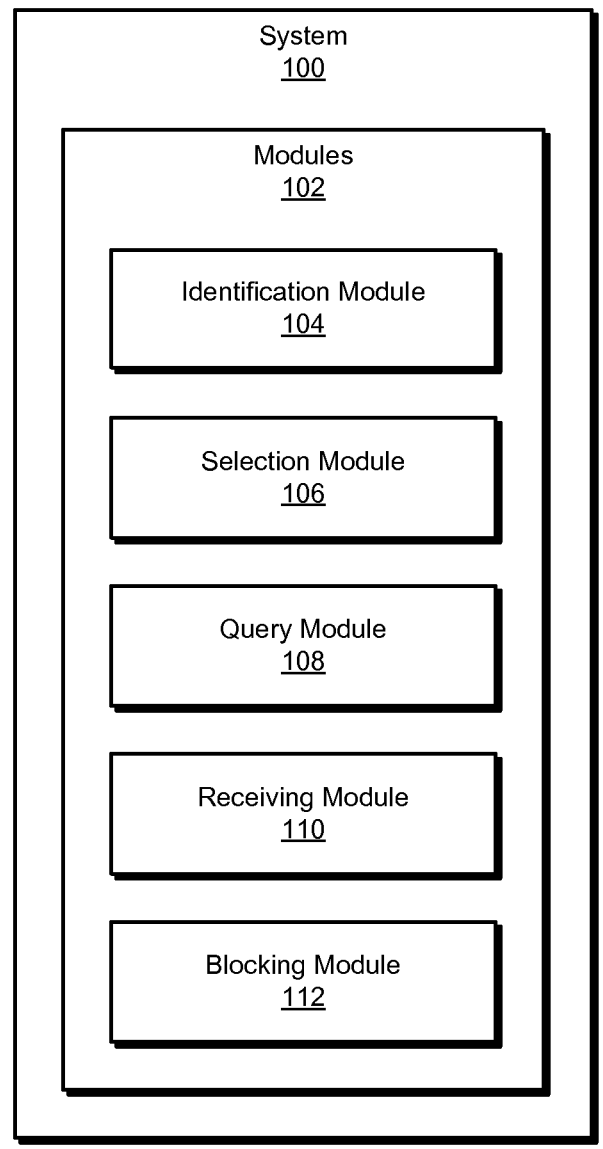
FIG. 1 is a block diagram of an exemplary system for managing web browser histories.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for managing web browser histories. As will be explained in greater detail below, by selecting categories of websites to be blocked from being referenced in a web browser history, the systems and methods described herein help preserve confidentiality of sensitive aspects of a user's web browsing habits while continuing to collect the browsing history of less sensitive websites. In some examples, the systems described herein may be configured once and modified only as needed, and therefore may operate discreetly and automatically, without burdening the user's time or attention. Aspects of the systems described herein may help ensure the confidentiality of configuration and operating data.

Figure 2:
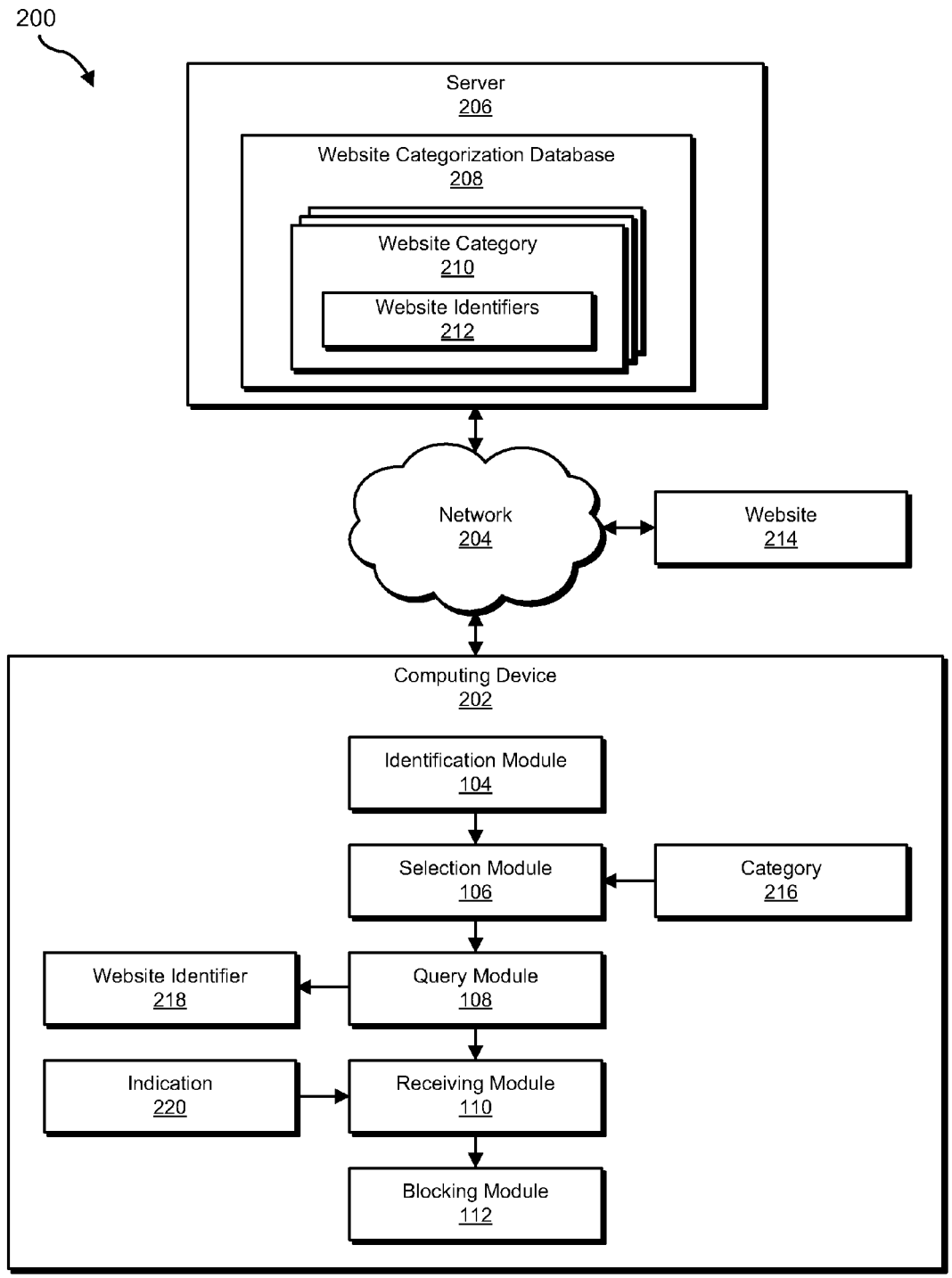
FIG. 2 is a block diagram of an exemplary system for managing web browser histories.
Figure 3:
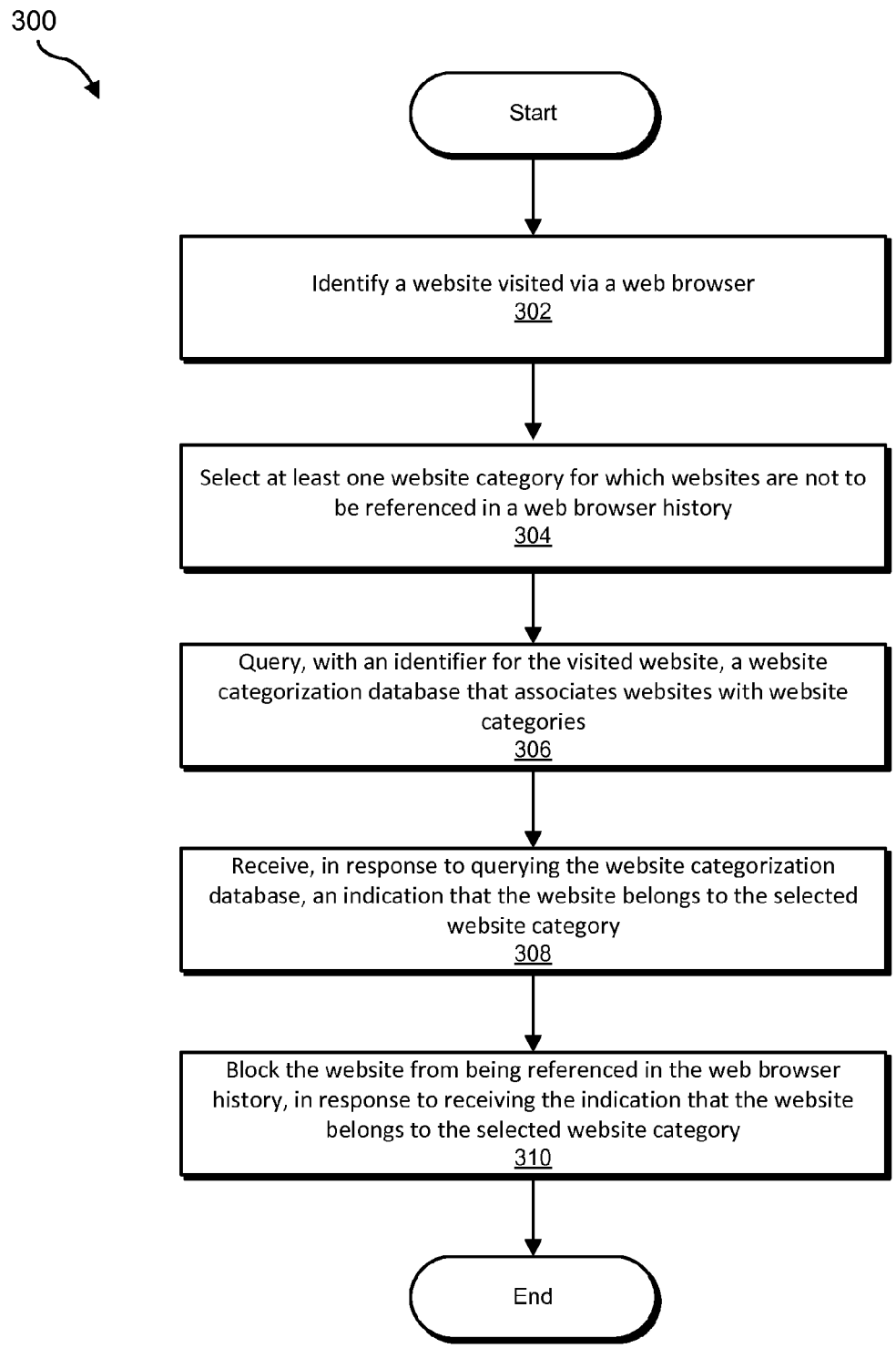
FIG. 3 is a flow diagram of an exemplary method for managing web browser histories.
Figure 4:
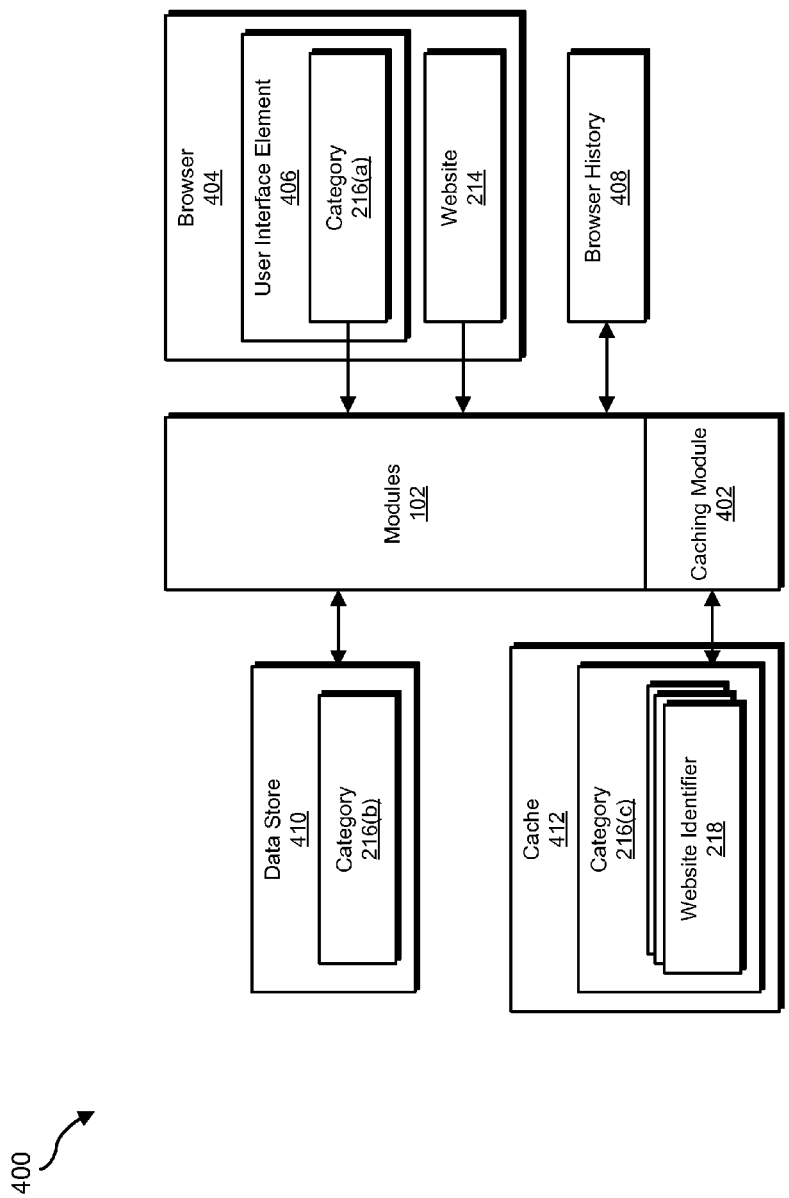
FIG. 4 is a block diagram of exemplary system for managing web browser histories.

The following will provide, with reference to FIGS. 1, 2, and 4, detailed descriptions of exemplary systems for managing web browser histories. Detailed descriptions of corresponding computer-implemented methods will also be provided in connection with FIG. 3. Detailed descriptions of an exemplary user interface will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for managing web browser histories. As illustrated in this figure, exemplary system 100 may include one or more modules 102 for performing one or more tasks. For example, and as will be explained in greater detail below, exemplary system 100 may include an identification module 104 that identifies a website visited via a web browser. Exemplary system 100 may also include a selection module 106 that selects at least one website category for which websites are not to be referenced in a web browser history.

In addition, and as will be described in greater detail below, exemplary system 100 may include a query module 108 that queries, with an identifier for the visited website, a website categorization database that associates websites with website categories. Furthermore, exemplary system 100 may include a receiving module 110 that receives, in response to querying the website categorization database, an indication that the website belongs to the selected website category. Exemplary system 100 may also include a blocking module 112 that blocks the website from being referenced in the web browser history, in response to receiving the indication that the website belongs to the selected website category. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, facilitate managing web browser histories in computing device 202 and/or server 206. For example, and as will be described in greater detail below, one or more of modules 102 may cause computing device 202 and/or server 206 to (1) identify a website 214 visited via a web browser, (2) select at least one website category 216 for which websites are not to be referenced in a web browser history that is accessible to the web browser, (3) query, with an identifier 218 for visited website 214, a website categorization database 208 that associates website identifiers 212 with website categories 210, (4) receive, in response to querying website categorization database 208, an indication 220 that the website 214 belongs to the selected website category 216, and (5) block website 214 from being referenced in the web browser history, in response to receiving the indication 220 that website 214 belongs to selected website category 216.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of storing, comparing, and/or providing data. Examples of server 206 include, without limitation, web servers, application servers and database servers configured to provide various database services and/or run certain software applications. For example, server 206 may represent a combination web server and database server configured to respond to database queries submitted via web protocols.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for managing web browser histories. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a website visited via a web browser. For example, at step 302 identification module 104 may, as part of computing device 202 in FIG. 2, identify website 214 as being visited via a web browser.

As used herein, the term "website" may refer to any addressable resource that may be categorized and that may be saved in a web browser history. For example, the term "website" may refer to static or dynamically generated web pages, web applications based on frameworks such as Ajax, JAVASCRIPT, or ADOBE FLASH, or content delivered by web application platforms such as MICROSOFT SHAREPOINT.

Identification module 104 may identify website 214 in any suitable context. In some examples, identification module 104 may operate integrally to the web browser and obtain access to websites as they are visited by the web browser. In other examples, identification module 104 may utilize application programming interfaces (e.g., provided by the browser or operating system). In some examples, identification module 104 may operate in a defined modular application format such as a browser plug-in. In these examples, identification module 104 may thereby identify websites from network interfaces as network requests are transmitted or as network data is received, or from file system interfaces as websites are saved to the browser history. In some examples, identification module 104 may identify website 214 by parsing a file that stores the web browser history. Additionally or alternatively, the web browser history may be saved in a centrally-accessible location (e.g., in cloud storage) in association with a user account (e.g., to be available to the user from multiple clients and/or web browsers). Accordingly, identification module 104 may identify website 214 by retrieving website identifier 218 of website 214 from a web browser history stored in the cloud.

FIG. 4 illustrates an exemplary system 400 for managing browser histories. As shown in FIG. 4, system 400 may include a browser 404. Using FIG. 4 as an example, at step 302 identification module 104 may identify website 214 as a visited website. For example, identification module 104 may identify website 214 as a visited website when browser 404 accesses website 214. Additionally or alternatively, identification module 104 may identify website 214 by reading from a browser history 408.

Returning to FIG. 3, at step 304 one or more of the systems described herein may select at least one website category for which websites are not to be referenced in a web browser history. For example, at step 304, selection module 106 may, as part of computing device 202 in FIG. 2, select category 216 as a website category for which websites are not to be referenced in the web browser history.

Selection module 106 may select website category 216 in any of a variety of ways. For example, selection module 106 may select website category 216 from a list of default website categories to keep private. Additionally or alternatively, selection module 106 may select website category 216 by receiving input via a user interface that selects website category 216 for exclusion from browser history. For example, the user interface may provide a list of website categories to exclude (e.g., including suggested website categories to exclude based on exclusion popularity by ordering for priority and/or highlighting the suggested categories within the user interface). As another example, the user interface may accept search terms for names and/or descriptions of website categories. In some examples, the user interface may present a user with an option of showing the categories of a website listed in a browser history and/or a currently loaded website. In these examples, the user interface may enable the user to select from the categories of the listed and/or loaded website.

In some examples, selection module 106 may select website category 216 by retrieving configuration data that specifies that website category 216 was previously selected and/or configured for exclusion from browser history. For example, after a user selects one or more website categories for exclusion from the web browser history, selection module 106 may save the selection in an encrypted and/or obfuscated format that is only accessible via an authenticated user account.

As used herein, the phrase "website category" may refer to any group of websites that can be characterized by a common factor, such as content or purpose. A few examples of the many categories a user may choose to block from their web browser history include, without limitation, gambling or gaming sites, sites with pornographic or adult-oriented content, dating or social networking sites, hacker sites, sites with pirated content, peer-to-peer file sharing sites, shopping or e-commerce sites, employment search sites, or sites with religious content.

Using FIG. 4 as an example, a user interface element 406 may be used by selection module 106 to display a list of website categories from which the user may select one or more website categories. In one example, the set of website categories displayed by user interface element 406 have been previously identified as existing in website categorization database 208. In other examples, the set of website categories displayed by user interface element 406 may be obtained by querying website categorization database 208.

Figure 5:
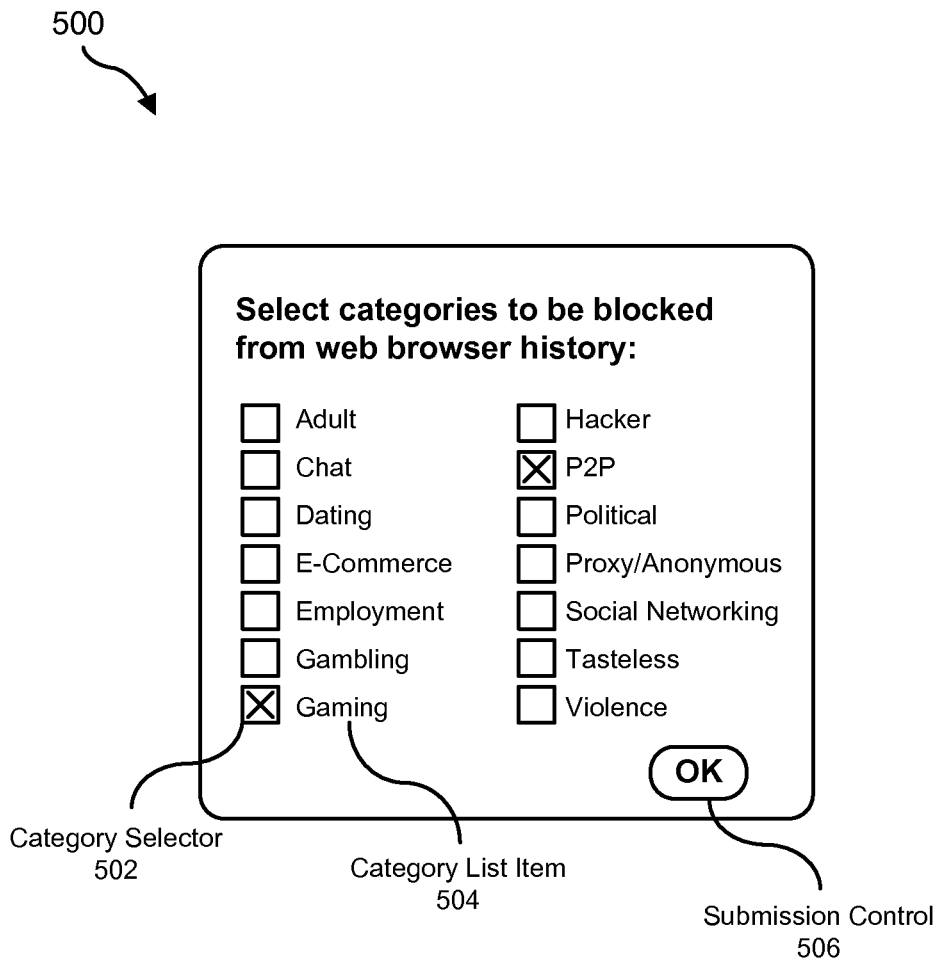
FIG. 5 is a graphical and textual depiction of an exemplary user interface for selecting website categories.

FIG. 5 depicts one example of a website category user interface 500, which may include website category list items (such as a category list item 504, "Gaming") and associated category selectors (such as a category selector 502). After selecting one or more website categories to be blocked from the web browser history, the user may complete category selection by activating a submission control 506. As the number of potential website categories could conceivably number in the hundreds, user interface 500 may take various forms to facilitate category selection by the user. For example, a tree structured display could be used to initially display a small number of broad categories and to provide the user the option to select broad categories to be blocked or to expand a broad category to view and select subcategories. In some examples, selection module 106 may repeatedly query categorization database 208 to obtain only the sets of broad categories or subcategories to be displayed.

Returning to FIG. 3, at step 306 one or more of the systems described herein may query, with an identifier for the visited website, a website categorization database that associates websites with website categories. For example, at step 306 query module 108 may, as part of computing device 202 in FIG. 2, query website categorization database 208 (e.g., a database that associates one or more websites, such as those identified by website identifiers 212, with one or more website categories, such as website category 210) with website identifier 218 corresponding to website 214, to determine whether website identifier 218 belongs to selected website category 216. Using FIG. 4 as another example, query module 108 may query categorization database 208 to determine whether website 214 belongs to website category 216(*a*) that was selected from user interface element 406.

Website categorization database 208 may include any suitable database, repository, and/or data structure for relating websites to website categories. In some examples, website categorization database 208 may include one or more existing web categorization databases (e.g., used for security, content filtering, parental control, and/or other purposes), such as the RULESPACE WEB CATEGORIZATION SOLUTION, to associate each website with one or more of many categories.

Query module 108 may query website categorization database 208 in any suitable manner. In some examples, query module 108 may query a centralized database of website categorizations with website identifier 218 of visited website 214 and receive the selected website category (e.g., category 216) in response. Additionally or alternatively, query module 108 may analyze (and/or request analysis) of visited website 214. For example, query module 108 may parse visited website 214 for key terms that indicate a category of visited website 214.

In some examples, the visited website may include a web page with one or more search engine results (e.g., with potentially sensitive search terms and/or search results). In these examples, query module 108 may query the website categorization database using one or more of the websites listed and/or linked to within the web page of search engine results (e.g., to apply the categories of the websites listed in the search results to the web page of search results). Additionally or alternatively, query module 108 may query the website categorization database with the web page and the website categorization database may identify the website categories of the individual search results and return these website categories to query module 108.

For example, query module 108 may query the website categorization database with a web page of search results for the search terms "sklansky theory." While the search engine website may not be categorized as a "gambling" website, query module 108 and/or the website categorization database may extract the web pages linked to within the search results and the website categorization database may determine that the category of one or more of these web pages includes "gambling." Accordingly, query module 108 may receive "gambling" as a category of the web page of search results. In this manner, even if a search engine website itself is not associated with a sensitive category, the systems and methods described herein may provide privacy by excluding sensitive searches from browser histories based on the categories of websites returned in the sensitive searches. Furthermore, in some examples, these systems may successfully exclude sensitive searches from browser histories without relying on the search terms of the sensitive searches (e.g., without recognizing that the search terms "sklansky theory" refer to a subject pertaining to gambling).

As depicted in FIG. 4, exemplary system 400 may include a data store 410 where selected website categories 216(*b*) may be stored between browsing sessions. To prevent disclosure of the selected categories, data store 410 may be encrypted, with the contents accessible only after the user has been authenticated. So that previously-selected categories may continue to be blocked in a new browsing session, selection module 106 may, in one example, retrieve and decrypt previously selected website categories 216(*b*) from data store 410.

Returning to FIG. 3, at step 308 one or more of the systems described herein may receive, in response to querying the website categorization database, an indication that the website belongs to the selected website category. For example, at step 308 receiving module 110 may, as part of computing device 202 in FIG. 2, receive indication 220 from website categorization database 208 that website 214 (that corresponds to website identifier 218) belongs to the selected website category 216.

Receiving module 110 may receive any suitable indication that the website belongs to the selected website category. For example, receiving module 110 may receive a message with an identifier of website category 216 in response to the query of website categorization database 208.

Using FIG. 4 as an example, exemplary system 400 may include a caching module 402 that utilizes a cache 412 to store one or more website categories 216(*c*) and associated previously visited website identifiers 218. By caching previously visited websites, system 400 may verify that a visited website 214 belongs to a selected category 216(*b*) without the need to query a remote website categorization database. As with the data store 410, cache 412 may be encrypted and accessible only to an authenticated user.

In one example, caching module 402 may utilize a one-way hash when encrypting the cache 412. Query module 108 may determine that website identifier 218 is represented in cache 412 by encrypting website identifier 218 with the one-way hash function and searching the cache for the presence of the encrypted website identifier. In this manner, query module 108 may determine that website category 216(*c*) applies to website identifier 218. Thereby, query module 108 may determine that a visited website belongs to a category previously selected to be blocked without undertaking the possible security risk or processor utilization of fully decrypting cache 412.

Returning to FIG. 3, at step 310 one or more of the systems described herein may block the website from being referenced in the web browser history, in response to receiving the indication that the website belongs to the selected website category. For example, at step 310 blocking module 112 may, as part of computing device 202 in FIG. 2, block website identifier 218 corresponding to website 214 from being referenced in the web browser history in response to receiving indication 220 that website identifier 218 belongs to selected website category 216.

Blocking module 112 may block website 214 from being referenced in the web browser history in any suitable manner. In some examples, blocking module 112 may block website 214 from being referenced in the web browser history by preventing website identifier 218 from being saved in the web browser history. For example, blocking module 112 may utilize a web browser API to manage data written to the web browser history. Alternatively, blocking module 112 may utilize operating system APIs to intercept data flows between the browser and the storage system on which the browser history resides and to prevent blocked websites from being written to the browser history.

In some examples, blocking module 112 may block website 214 from being referenced in the web browser history by retrieving website identifier 218 for visited website 214 from the web browser history and deleting website identifier 218 for website 214 from the web browser history. For example, blocking module 112 may monitor the browser history and delete references to websites to be blocked immediately after they are written. Additionally or alternatively, blocking module 112 may periodically check the browser history and deleted references to websites to be blocked. In some examples, blocking module 112 may check the web browser history for and delete references to websites with category 216 in response to category 216 being selected.

Using FIG. 4 as an example, exemplary system 400 may prevent browser 404 from referencing website 214 in browser history 408. In one example, the system 400 may block a previously visited website 214 from being referenced in web browser history 408 by scanning web browser history 408 and deleting references to websites 214 belonging to selected categories 216(a).

The various modules and components of the exemplary system 400 may be combined or distributed among various device configurations. For example, browser 404 may represent browsers on multiple devices that share a single browser history 408 stored on a network-accessible or "cloud" storage location.

In some examples, the systems described herein may function either as a feature of a web browser or as a separate product and/or application that monitors and modifies the history entries of other browsers on a computing system. These systems may allow a user to select one or more categories of web sites that should never appear in a browser history. Once the categories have been selected, these systems may look up the category of each visited site using a database of site-to-category mappings. For each site visited, if the site is associated with a category that the user selected earlier for exclusion from the browser history, these systems may remove the history entry and/or prevent the history entry from being created. These systems may thereby automatically protect the user's privacy when browsing sensitive sites and may eliminate the need for any manual steps to be taken by the user.

In order to obtain the site category for each visited website, these systems may leverage one or more existing web categorization databases (e.g., used for security, content filtering, parental control, and/or other purposes), such as the RULESPACE WEB CATEGORIZATION SOLUTION, to associate each website with one or more of many categories. Because the categorization database may be very large, instead of storing the categorization database client-side, these systems may perform queries to a server to discover the category for a visited site. To improve performance and decrease bandwidth usage, the systems described herein may cache the categories for previously visited web sites on the client so that frequently visited sites do not require multiple queries to the server. In some examples, these systems may obfuscate site entries (e.g., website names, addresses, and/or categories), such as by using a one-way hash function, so that the cache itself does not contain the browsing history that these systems are meant to remove.

In some examples, these systems may monitor visited sites and clear the sites from a web browser history. For example, these systems may be implemented as a part of a web browser and/or a browser plug-in. Additionally or alternatively, these systems may function as a separate application from a web browser, e.g., by using system APIs to examine and delete entries from the stock web browser history of a system (e.g., an ANDROID system). In some examples, these systems may periodically iterate over all entries in the browser history and delete those that correspond to categories selected by the user.

As described above, by providing systems and methods for selecting categories of websites to be blocked from being referenced in a web browser history, the embodiments described herein may help preserve confidentiality of sensitive aspects of a user's web browsing habits while continuing to collect the browsing history of less sensitive websites. In some examples, the systems described herein may be configured once and modified only as needed and therefore may operate discreetly and automatically, without burdening the user's time or attention. Aspects of the systems described herein may help ensure the confidentiality of configuration and operating data.

Figure 6:
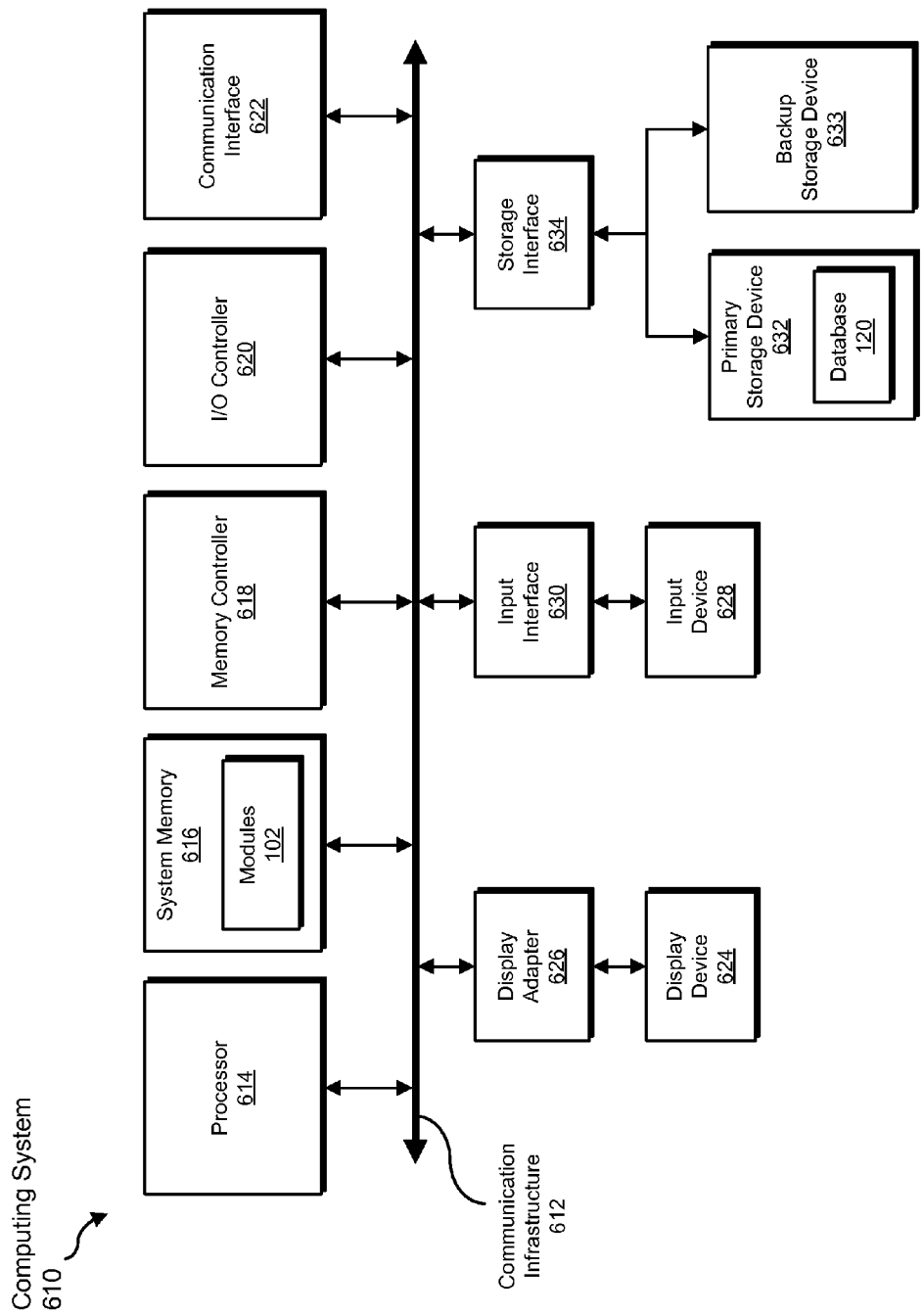
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
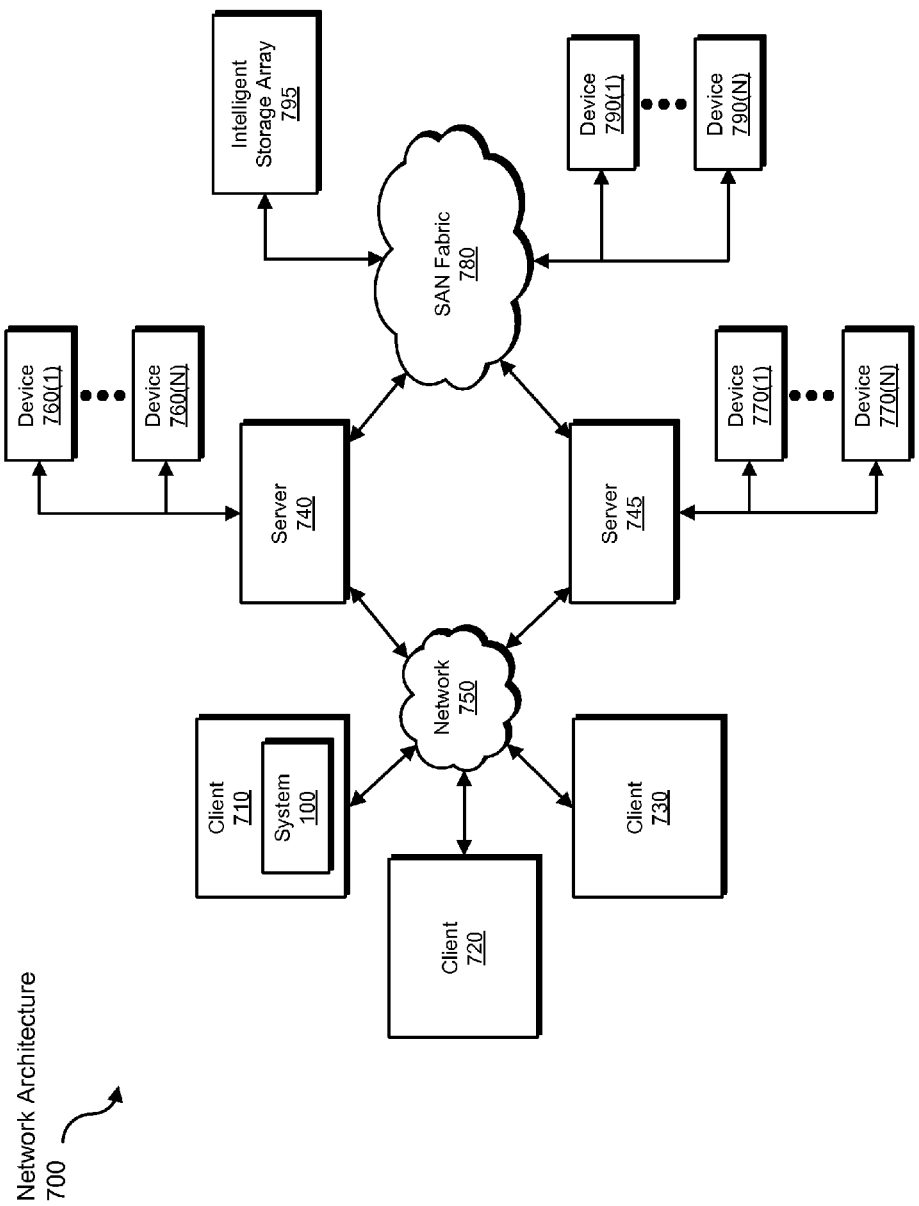
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for managing web browser histories.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a system for managing browser history to a system for managing records of file access or application usage. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing web browser histories, at least a portion of the method being performed by a computing device comprising at least one processor, the method comprising:
  identifying a visit to a website, wherein the website was visited via a web browser installed on the computing device;
  selecting at least one website category for which websites are not to be referenced in a web browser history that is accessible to the web browser;
  querying, with an identifier for the visited website, a remote centralized website categorization database that maps websites to website categories for a category indication that indicates that the website belongs to the website category;

receiving, at the computing device from the remote centralized website categorization database, the category indication that indicates that the website belongs to the website category;

using the category indication to cache, in a local cache at the computing device a history indication, in an encrypted form, that indicates that the website belongs to the website category and as a result should not be referenced in the web browser history;

after the category indication is received from the remote centralized website categorization database and without querying the remote centralized website categorization database:

identifying a subsequent visit to the website;

querying the local cache to identify the history indication that indicates that the website should not be referenced in the web browser history; and blocking the website from being referenced in the web browser history in response to identifying the history indication that indicates that the website should not be referenced in the web browser history.

2. The method of claim 1, wherein selecting the website category comprises:

displaying a user interface element that enables a user to select the website category;

receiving from the user a selection of the website category.

3. The method of claim 2, further comprising:

querying the remote centralized website categorization database for a list of website categories, prior to displaying the user interface element;

including the website category in the user interface element based on identifying the website category within the list of website categories.

4. The method of claim 2, wherein:

the website category previously selected via the user interface to not be referenced in the web browser history is encrypted, and stored in a data store;

selecting the website category comprises retrieving the encrypted website category from the data store and decrypting the website category to determine that the website category is not to be referenced in the web browser history.

5. The method of claim 4, wherein decrypting the website category comprises authenticating a user that previously selected the website category via the user interface to preserve the website category having been selected as private to the user.

6. The method of claim 1, wherein:

caching the history indication comprises:

caching an encrypted version of the identifier for the visited website in the local cache;

caching, in response to receiving the category indication from the remote centralized website categorization database, the website category in the local cache in association with the encrypted version of the identifier;

identifying the subsequent visit to the website comprises identifying a subsequent website identifier of the website;

blocking the website from being referenced in the web browser history comprises searching the local cache with the subsequent website identifier and determining that the website category is associated with the subsequent website because the subsequent website identifier matches the identifier for the visited website.

7. The method of claim 6, wherein:

caching the encrypted version of the identifier for the visited website comprises encrypting the identifier for the visited website using a one-way hash function;

searching the local cache with the subsequent website identifier comprises encrypting the subsequent website identifier with the one-way hash function and searching the local cache with the encrypted subsequent website identifier to identify the website category associated with the visited website without revealing the identifier for the visited website.

8. The method of claim 1, wherein the website category comprises a category of website content.

9. The method of claim 1, wherein:

identifying the visited website comprises retrieving the identifier for the visited website from the web browser history;

blocking the website from being referenced in the web browser history comprises deleting the identifier for the visited website from the web browser history.

10. A system for managing web browser histories, the system comprising:

a memory that stores:

an identification module that identifies a visit to a website, wherein the website was visited via a web browser;

a selection module that selects at least one website category for which websites are not to be referenced in a web browser history that is accessible to the web browser;

a query module that queries, with an identifier for the visited website, a remote centralized website categorization database that maps websites to website categories for a category indication that indicates that the website belongs to the website category;

a receiving module that receives, from the remote centralized website categorization database, the category indication that indicates that the website belongs to the website category;

a caching module that uses the category indication to cache, in a local cache a history indication, in an encrypted form, that indicates that the website belongs to the website category and as a result should not be referenced in the web browser history, wherein:

the identification module further identifies, after the category indication is received from the remote centralized website categorization database and without querying the remote centralized website categorization database, a subsequent visit to the website;

the query module further queries, after the category indication is received from the remote centralized website categorization database and without querying the remote centralized website categorization database, the local cache to identify the history indication that indicates that the website should not be referenced in the web browser history;

a blocking module that blocks, after the category indication is received from the remote centralized website categorization database and without querying the remote centralized website categorization database, the website from being referenced in the web browser history in response to identifying the history indication that indicates that the website should not be referenced in the web browser history;

at least one processor that executes the identification module, the selection module, the query module, the receiving module, and the blocking module.

11. The system of claim 10, wherein the selection module selects the website category by:
  displaying a user interface element that enables a user to select the website category;
  receiving from the user a selection of the website category.

12. The system of claim 11, wherein the selection module:
  queries the remote centralized website categorization database for a list of website categories, prior to displaying the user interface element;
  includes the website category in the user interface element based on identifying the website category within the list of website categories.

13. The system of claim 11, wherein:
  the website category previously selected via the user interface to not be referenced in the web browser history is encrypted, and stored in a data store;
  the selection module selects the website category by retrieving the encrypted website category from the data store and decrypting the website category to determine that the website category is not to be referenced in the web browser history.

14. The system of claim 13, wherein decrypting the website category comprises authenticating a user that previously selected the website category via the user interface to preserve the website category having been selected as private to the user.

15. The system of claim 10:
  wherein the caching module caches the history indication by:
    caching an encrypted version of the identifier for the visited website in the local cache;
    caching the website category in the local cache in association with the encrypted version of the identifier in response to the category indication having been received from the remote centralized website categorization database;
  wherein the identification module identifies the subsequent visit to the website by identifying a subsequent website identifier of the website;
  wherein the blocking module blocks the website from being referenced in the web browser history based on searching the local cache with the subsequent website identifier and determining that the website category is associated with the subsequent website because the subsequent website identifier matches the identifier for the visited website.

16. The system of claim 15, wherein:
  the caching module caches the encrypted version of the identifier for the visited website by encrypting the identifier for the visited website using a one-way hash function;
  the blocking module searches the local cache with the subsequent website identifier by encrypting the subsequent website identifier with the one-way hash function and searches the local cache with the encrypted subsequent website identifier to identify the website category associated with the visited website, without revealing the identifier for the visited website.

17. The system of claim 10, wherein the blocking module blocks the website from being referenced in the web browser history by preventing the website identifier from being saved in the web browser history.

18. The system of claim 10, wherein:
  the identification module identifies the visited website by retrieving the identifier for the visited website from the web browser history;
  the blocking module blocks the website from being referenced in the web browser history by deleting the identifier for the visited website from the web browser history.

19. A non-transitory computer-readable medium comprising one or more computer-executable instructions executed by at least one processor of a computing device that cause the computing device to:
  identify a visit to a website, wherein the website was visited via a web browser installed on the computing device;
  select at least one website category for which websites are not to be referenced in a web browser history that is accessible to the web browser;
  query, with an identifier for the visited website, a remote centralized website categorization database that maps websites to website categories for a category indication that indicates that the website belongs to the website category;
  receive, at the computing device from the remote centralized website categorization database, the category indication that indicates that the website belongs to the website category;
  use the category indication to cache, in a local cache at the computing device, a history indication, in an encrypted form, that indicates that the website belongs to the website category and as a result should not be referenced in the web browser history;
  identify, after the category indication is received from the remote centralized website categorization database and without querying the remote centralized website categorization database, a subsequent visit to the website;
  query, after the category indication is received from the remote centralized website categorization database and without querying the remote centralized website categorization database, the local cache to identify the history indication that indicates that the website should not be referenced in the web browser history;
  block, after the category indication is received from the remote centralized website categorization database and without querying the remote centralized website categorization database, the website from being referenced in the web browser history in response to identifying the history indication that indicates that the website should not be referenced in the web browser history.

20. The non-transitory computer-readable medium of claim 19, wherein the one or more computer-executable instructions, when executed by the processor of the computing device, further cause the computing device to:
  display a user interface element that enables a user to select the website category;
  receive from the user a selection of the website category.

* * * * *